United States Patent

Matsumoto et al.

[11] Patent Number: 5,941,348
[45] Date of Patent: Aug. 24, 1999

[54] PAD CLIP FOR DISC BRAKE

[75] Inventors: Takashi Matsumoto; Kiyokazu Mori, both of Saitama, Japan

[73] Assignee: Akebono Brake Industry Co., Ltd., Tokyo, Japan

[21] Appl. No.: 08/956,021

[22] Filed: Oct. 22, 1997

[30] Foreign Application Priority Data

Oct. 23, 1996 [JP] Japan ................................. 8-299449

[51] Int. Cl.⁶ .................................................. F16D 65/02
[52] U.S. Cl. ...................... 188/73.38; 188/73.36
[58] Field of Search ........................ 188/73.36–73.38, 188/250 E, 73.31

[56] References Cited

U.S. PATENT DOCUMENTS

| | | | |
|---|---|---|---|
| 4,245,723 | 1/1981 | Moriya | 188/73.38 |
| 4,609,077 | 9/1986 | Nakatsuhara | 188/73.38 |
| 5,025,897 | 6/1991 | Hirashita et al. | 188/73.38 |
| 5,472,067 | 12/1995 | Fujiwara | 188/73.38 |
| 5,687,817 | 11/1997 | Kobayashi et al. | 188/73.38 |
| 5,699,882 | 12/1997 | Ikegami et al. | 188/73.38 |

FOREIGN PATENT DOCUMENTS 0255729 10/1989 Japan ................................. 188/73.38
2-18353 5/1990 Japan .

*Primary Examiner*—Chris Schwartz
*Attorney, Agent, or Firm*—Morgan, Lewis & Bockius LLP

[57] ABSTRACT

A friction pad for braking cooperates with a support member, which receives a brake torque produced in the friction pad, in forming a recess and projection fitting portion. A pad clip is interposed between the friction pad and the support member to thereby be able to reduce the sliding resistance of the friction pad. An anchor piece, which extends downwardly from a U-shaped portion of the pad clip, is inclined and disposed in such a manner that a pad contact portion, which serves as a contact portion between the anchor piece and friction pad is situated more outwardly in the rotor diameter direction than a support contact portion serving as a contact portion between the anchor piece and the support member. Due to such arrangement of the anchor piece, the energizing actions of the anchor piece and rotor diameter direction pressing portion with the support member contact portion as the fulcrum thereof can restrict the movement of the friction pad to thereby prevent generation of a rattling noise.

12 Claims, 4 Drawing Sheets

PAD CLIP FOR DISC BRAKE

BACKGROUND OF THE INVENTION

1. Field of the Invention

The present invention relates to a pad clip for use in a disc brake which is used to brake a vehicle and, in particular, to an improved pad clip which holds a friction pad movable in the axial direction of a rotor in such a manner that the sliding resistance of the friction pad with respect to a support member can be reduced.

2. Related Art

Conventionally, in a disc brake, there are mounted on a support member a pair of friction pads which are to be disposed in such a manner that they can hold a rotor between them, the rotor is held by and between a caliper reaction portion and a hydraulic cylinder device, and, when the friction pads are to be rotated together with the rotor, the side edge portions of the friction pads are anchored by a support member, thereby being able to exert a brake force. Since the friction pads are moved in such a manner that they are in contact with the rotor surface while they are being held by the support member, in the anchor portions of the disc brake between the friction pads and the support member, there are mounted a pair of pad clips which are used to reduce the sliding friction of the friction pads. These pad clips are mounted on the anchor surfaces of the support member facing the side edges of the friction pads, and are respectively so formed after the anchor shapes of the support member as disclosed, for example, in Japanese Utility Model Publication No. Hei. 2-18353.

Here, FIG. 4 is an enlarged section view of the main portions of a conventional pad clip. As shown in FIG. 4, a friction pad 1 includes a projecting portion 1A, while a support member 2 includes a recessed groove portion 2A which corresponds to and can be fitted with the projecting portion 1A. And, the projecting portion 1A and recessed groove portion 2A cooperate together in forming a recess and projection fitting portion, so that a brake torque generated by the friction pad 1 can be received by the support member 2. Here, between the friction pad 1 and the support member 2, there is interposed a pad clip 3 which is used to reduce the sliding friction produced between them. This pad clip 3 includes a U-shaped portion 3A, which is so formed as to have a shape after the shape of a support projecting portion 2B formed in the support member 2 and is used to hold the present support projecting portion 2B between the two sides thereof, and, due to the holding action of the present U-shaped portion 3A, the pad clip 3 can be retained by the support member 2. And, downwardly of the U-shaped portion 3A, through a side end face 3B which provides the inmost portion of the recess and projection fitting portion and is to be closely contacted with the recessed groove portion 2A, there is formed a rotor diameter direction pressing portion 3C which is used to press against the friction pad 1 outwardly in the rotor diameter direction; and, the friction pad 1 can be retained due to such pressing or energizing action of the rotor diameter direction pressing portion 3C.

In the conventional pad clip having the above-mentioned structure, there is provided a clearance (in FIG. 4, shown by a dimension a and a dimension b) in the recess and projection fitting portion, for the purpose of reducing the sliding friction between the friction pad and the support member. However, in the above-mentioned condition, if a brake operation is executed, then there is produced a moment of rotation in the friction pad due to its frictional contact with the rotor and there are thereby produced a couple of forces around the holding portion thereof. And, due to the production of the couple of forces, the friction pad is rotated by an amount corresponding to the clearances, thereby allowing the friction pad to tap the pad clip (the support member). This tapping operation is generated continuously by the vibration of the caliper caused by the braking operation and thus, due to the tapping operation of the friction pad on the pad clip (the support member), between the friction pad and an anti-rattle spring (the support member), there is generated a rattling noise which provides the cause of noise in the braking operation.

SUMMARY OF THE INVENTION

The present invention aims at eliminating the drawbacks found in the above-mentioned conventional pad clip for use in a disc brake. Accordingly, it is an object of the invention to provide a pad clip for use in a disc brake in which the movement of a friction pad in the braking operation of the disc brake can be restrained by a pad spring to thereby prevent the generation of a rattling noise.

In attaining the above object, according to the invention, there is provided a pad clip for use in a disc brake of a type that includes a friction pad disposed opposed to a rotor and a support member for supporting a brake force from the friction pad; in particular, the present pad clip for such disc brake is mounted between a end portion of the friction pad in the rotor peripheral direction thereof and an anchor portion of the support member for supporting the friction pad, and the pad clip includes a U-shaped portion formed after a projecting portion provided on the support member, a rotor diameter direction pressing portion for energizing the friction pad outwardly in the diameter direction of the rotor, and an inclined rotor peripheral direction pressing portion, characterized in that the inclined rotor peripheral direction pressing portion of the pad clip is interposed between the U-shaped portion and the rotor diameter direction pressing portion, and a point of contact between the rotor peripheral direction pressing portion and the friction pad is situated more outwardly in the rotor diameter direction than a point of contact between the rotor peripheral direction pressing portion and the support member.

According to the above-mentioned structure, since the rotor peripheral direction pressing portion of the pad clip is inclined and disposed in such a manner and the contact point between the rotor peripheral direction pressing portion and the friction pad is situated more outwardly in the rotor diameter direction than the contact point between the rotor peripheral direction pressing portion and the support member, the rotor peripheral direction pressing portion of the pad clip has a spring property. On the other hand, the rotor diameter direction pressing portion of the pad clip, which is so formed as to extend from the rotor peripheral direction pressing portion, is also arranged as a spring portion for biasing the friction pad outwardly in the rotor diameter direction. Therefore, if the friction pad is moved in the rotor peripheral direction, then the rotor diameter direction pressing portion of the pad clip presses against the friction pad outwardly in the rotor diameter direction with the contact point between the rotor peripheral direction pressing portion and the support member as the fulcrum thereof. And, due to the leverage, this pressing force increases as the friction pad is moved further in the rotor peripheral direction, thereby being able to restrict the movement of the friction pad, with the result that generation of a rattling noise caused by the collision of the friction pad with the support member through the pad clip can be prevented.

Also, if the friction pad is moved in the rotor diameter direction, then the rotor peripheral direction pressing portion presses against the friction pad through the contact point between the friction pad and the pad clip with the contact point between the rotor peripheral direction pressing portion and the support member as the fulcrum thereof. And, this pressing force, similarly to the movement of the friction pad in the rotor peripheral direction, due to the leverage, increases as the friction pad is moved further in the rotor peripheral direction, thereby being able to restrict the movement of the friction pad; and, as a result of this, it is possible to prevent generation of a rattling noise which can be produced by the collision of the friction pad with the support member through the pad clip.

Here, even if the friction pad is moved in a composite direction including the rotor peripheral direction and rotor diameter direction in combination, while the contact point between the rotor peripheral direction pressing portion and the support member serves as a fulcrum, according to the moving direction of the friction pad, the rotor peripheral direction pressing portion and the rotor diameter direction pressing portion press against the friction pad, thereby being able to restrict the movement of the friction pad. As a result of this, it is possible to prevent production of a rattling noise caused by the collision of the friction pad with the support member through the pad clip.

DESCRIPTION OF THE PREFERRED EMBODIMENTS

Now, description will be given below in detail of a concrete example of a pad clip for use in a disc brake according to a first embodiment of the invention with reference to FIGS. 1 and 2.

Figure 1:
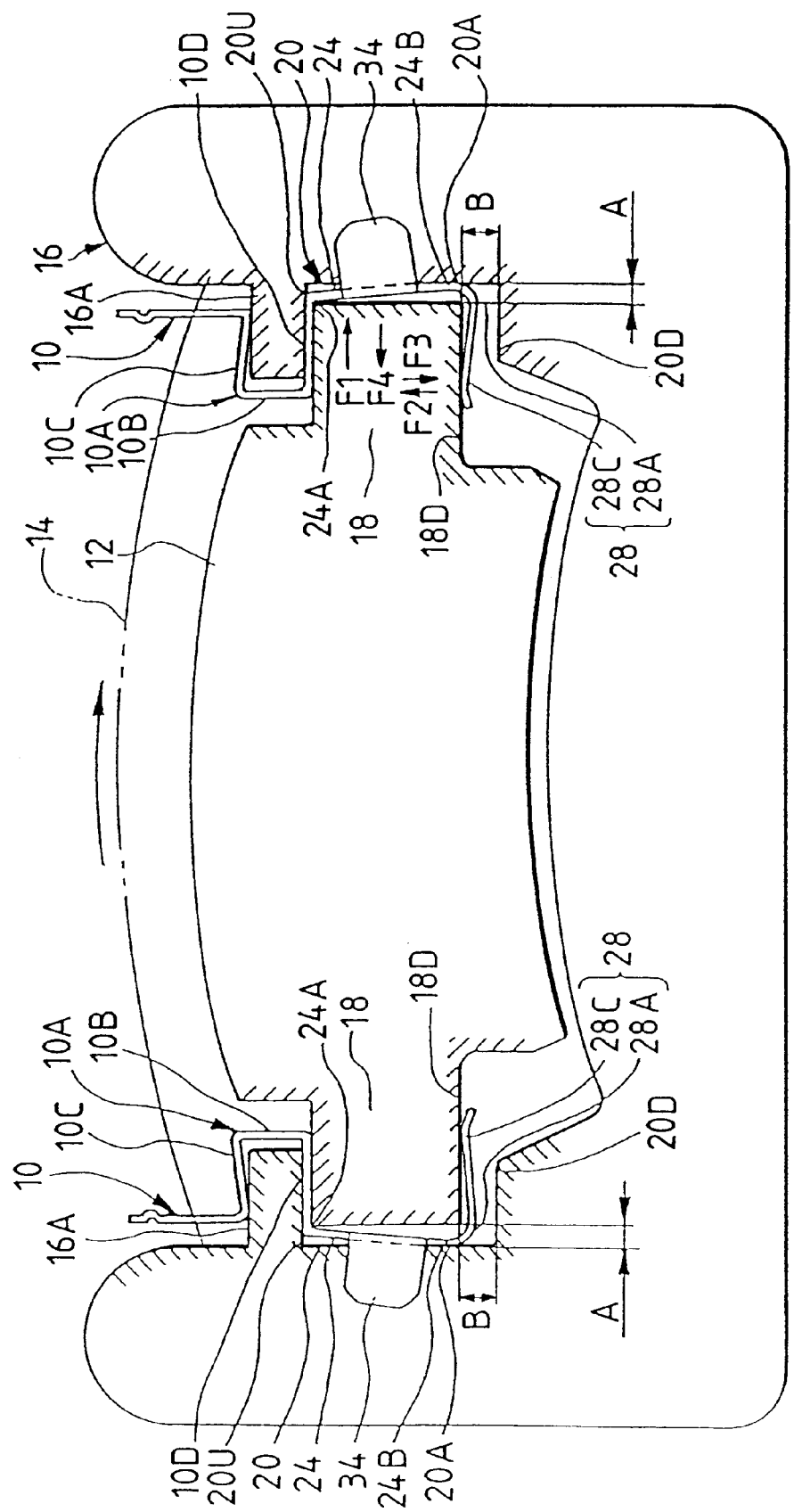
FIG. 1 is a section view of the main portions of a pad clip 10 according to a first embodiment of the invention.
Figure 2A:
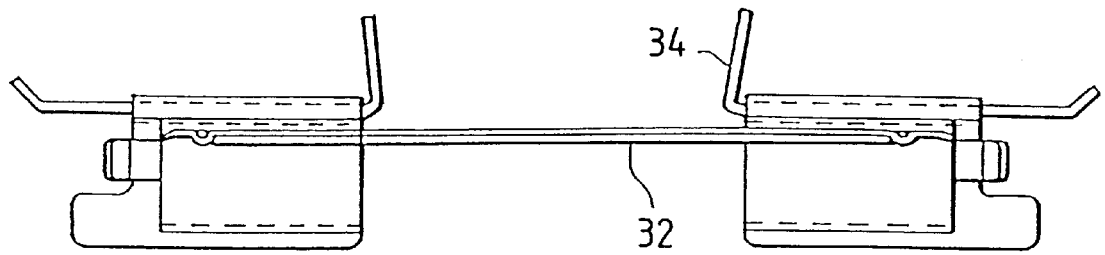
FIGS. 2A and 2B are front view and an upper plan view, respectively, of the pad clip according to the first embodiment.
Figure 2B:
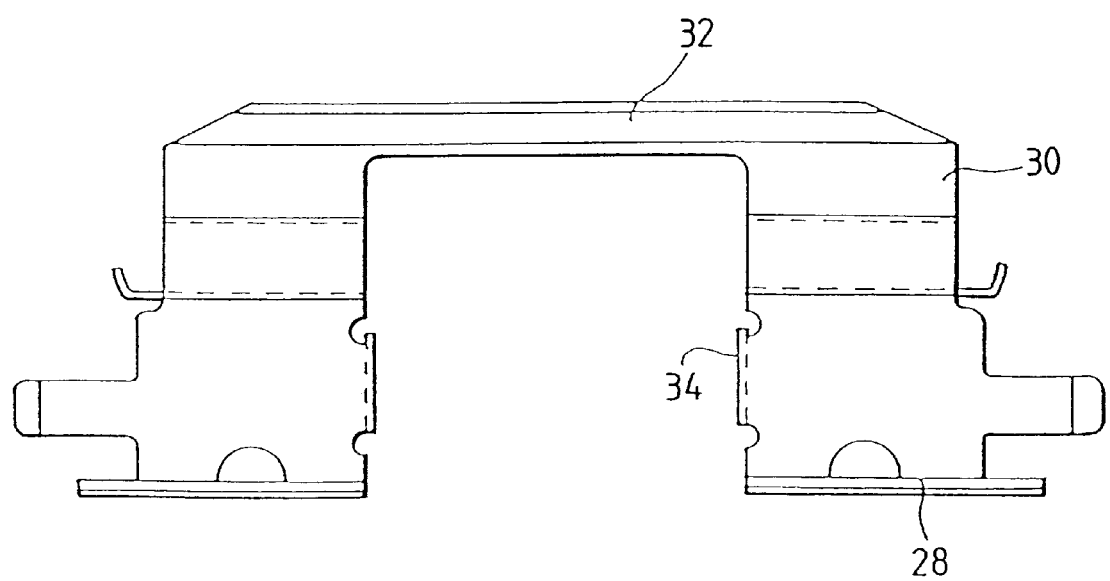

In particular, FIG. 1 is a section view of the main portions of a pad clip 10 according to the present embodiment, showing a state in which the pad clip 10 is mounted on a disc brake, and FIG. 2 shows a front view and an upper plan view of the pad clip 10.

As shown in FIG. 1, in order to move and guide a friction pad 12 in the axial direction (in a direction intersecting at right angles to the sheet surface of FIG. 1) of a rotor 14, there is formed a recess and projection fitting portion between the friction pad 12 and a support member 16 which is used to hold the friction pad 12 and functions as a brake anchor for the friction pad 12. In the illustrated embodiment, in each of the side edge portions of the friction pad 12, there is provided a projection 18 and, in each of the brake anchor portions of the side edge portions of the support member 16 respectively opposed to the friction pad side edge portions, there is formed a recessed groove portion 20, while the projection 18 and recessed groove portion 20 are fitted with each other. The pad clip 10 according to the present embodiment is disposed along a clearance between the thus formed recess and projection fitting portion and, in particular, two pad clips 10 are used so that they can hold the friction pad 12 similarly on both of the inner and outer sides thereof. Further, each of the pad clips 10 is formed by bending an inverted U-shaped flat member in such a manner that it can bridge the outer periphery of the rotor 14.

The pad clips 10 include, in the respective inner and outer side portions of the rotor 14, U-shaped portions 10A (that is, each of them has a U-like shape when it is viewed from the side thereof) which are formed after projecting portions 16A provided on the support member 16 to pressure hold the projecting portions 16A therein. That is, the U-shaped portion 10A is composed of a most projecting piece 10B which is so positioned as to face the most projecting portion of the projecting portion 16A, and mutually opposing pieces 10C and 10D which are bent respectively in the upper and lower ends of the most projecting piece 10B; and, by bending the opposing piece 10C at an acute angle with respect to the most projecting piece 10B, the opposing pieces 10C and 10D are allowed to provide a pressure holding action. And, the projecting portion 16A is pressure held by the U-shaped portion 10A to thereby allow the support member 16 to retain the pad clip 10. Also, upwardly of the U-shaped portion 10A (on the rotor outer periphery side), the leading end portion of the opposing piece 10C is bent further, and there is provided a connecting piece 30 which extends outwardly from a clearance between the respective opposing portions of the friction pad 12 and the support member 16. The connecting piece 30 is connected to a bridge portion 32 which is used to connect together the inner and outer sides of the rotor.

On the other hand, on the lower side of the U-shaped portion 10A (on the rotor inner peripheral side), the leading end of the opposing piece 10D is bent further to thereby provide an anchor piece or inclined rotor peripheral direction pressing portion 24 which forms a side end face extending along the anchor surface 20A of the recess and projection fitting portion situated in the inmost portion thereof and thus serves as a rotor peripheral direction pressing portion. Here, the opposing piece 10D and anchor piece 24 are bent at an obtuse angle with respect to each other, while the pad contact portion 24A of the anchor piece 24 serving as a contact portion between the anchor piece 24 and the friction pad 12 is inclined and disposed in such a manner that it is positioned more outwardly in the rotor diameter direction than the support member contact portion 24B of the anchor piece 24 serving as a contact portion between the anchor piece 24 and the support member 16. And, the height of such inclined position is so set as to correspond to a clearance (in FIG. 1, a dimension A) which prevents the support member 16 from having an effect on the friction pad 12 when the friction pad 12 produces a sliding friction. Further, a rotor diameter direction pressing portion 28 is disposed on and extended from the lower side of the anchor piece 24. This rotor diameter direction pressing portion 28 is formed as a plate spring portion which supports elastically the friction pad 12 outwardly in the rotor diameter direction. And, the rotor diameter direction pressing portion 28 is bent at the lower edge of the anchor piece 24 and extends further therefrom, while the rotor diameter direction pressing portion 28 includes an arc portion 28A which is bent and formed without being connected to the lower surface portion 20D of the recessed groove portion 20 of the support member 16, and an upward contact portion 28C which extends upwardly and obliquely from the arc portion 28A and can be contacted with the lower surface 18D of the projection 18 of the friction pad 12.

In the thus structured pad clip 10, in order that the opposing piece 10D, anchor piece 24 and rotor diameter direction pressing portion 28 can be fitted with the recessed groove portion 20 of the support member 16, the opposing piece 10D is disposed in close contact with the upper surface portion 20U of the recessed groove portion 20 and the support member contact portion 24B of the anchor piece 24 is contacted with the anchor surface 20A of the recessed groove portion 20. And, the rotor diameter direction pressing portion 28 is arranged such that it faces the lower surface portion 20D of the recessed groove portion 20. Here, in order to prevent the pad clip 10 from slipping off the support member 16 in the rotor axial direction, the anchor piece 24 of the pad clip 10 includes a support holding claw 34. Also, due to the fact that the rotor diameter direction pressing portion 28 holds the friction pad 12, there can be secured a dimension B which is a clearance between the lower surface 18D of the projection 18 and the lower surface portion 20D of the recessed groove portion 20, which assures that the friction pad 12 can be moved smoothly.

Now, the friction pad 12 is composed of a lining having a substantially fan-like outer shape and a back plate having substantially the same shape as the lining, and includes two mutually opposing side edge portions on the respective anchor area end faces thereof in the rotation direction of the rotor 14. As described before, on the two side edge portions of the friction pad 12, there are provided the two projections 18 which are to be engaged with the recessed groove portion 20 of the support member 16. And, if the two projections 18 on the two rotor peripheral direction sides are respectively engaged with the opposing pieces 10D of the pad clip 10, the anchor pieces 24, and the rotor diameter direction pressing portion 28, then the respective friction pads 12 can be disposed on the inner and outer sides of the rotor 14. Here, if the projections 18 of the friction pads 12 are inserted in such a manner that they press down the rotor diameter direction pressing portions 28, then the friction pads 12 can be mounted onto the pad clips 10 respectively.

Now, the operation of the thus structured pad clip 10 is as follows. That is, to brake a vehicle while it is running, the pair of friction pads 12 are respectively pressed toward the rotor 14 by a fluid pressure cylinder mechanism provided in a caliper (not shown). In this pressing operation, the two friction pads 12 pressure hold the rotor 14 between them and thus rotate and move together with the rotor 14, when there is generated the moment of rotation in the two friction pads 12, thereby producing a couple of forces which operate to rotate the friction pads 12 around their pressure holding portions. Due to such couple of forces, the friction pads 12 are caused to rotate, so that the projections 18 of the friction pads 12 press against the pad clips 10 on the rotor rotation side.

In this case, the anchor pieces 24 of the pad clips 10 and the rotor diameter direction pressing portions 28 support elastically the pressing forces with the support member contact portions 24B as the fulcrums. That is, when the pressing forces from the friction pads 12 are applied in the rotor peripheral direction (F1), with the support member contact portions 24B as the fulcrums, the energizing forces (F2) of the rotor diameter direction pressing portions 28 pressing the friction pads 12 outwardly in the rotor diameter are caused to increase, thereby being able to restrict the movements of the friction pads 12. This in turn prevents the friction pads 12 from tapping the support member 16 through the pad clips 10, so that generation of a rattling noise can be prevented.

Also, when the pressing forces from the friction pads 12 are applied in the rotor diameter direction (F3), with the support member contact portions 24B as the fulcrums, the energizing forces (F4) of the anchor pieces 24 pressing the friction pads 12 in the rotor peripheral direction are caused to operate, thereby being able to restrict the movements of the friction pads 12. Due to this, similarly to the above-mentioned case, the friction pads 12 are prevented from tapping the support member 16 through the pad clips 10, which in turn prevents generation of a ratting noise.

Further, even if the friction pads 12 are moved in a composite direction including the rotor peripheral direction and rotor diameter direction in combination, with the support member contact portions 24B as the fulcrums, the anchor piece 24 and rotor diameter direction pressing portions 28 press against the friction pads 12 according to the moving direction of the friction pads 12, thereby being able to restrict the movements of the friction pads 12. As a result of this, it is possible to prevent generation of a rattling noise which is caused by the collision of the friction pads 12 with the support member 16 through the pad clips 10.

Figure 3:
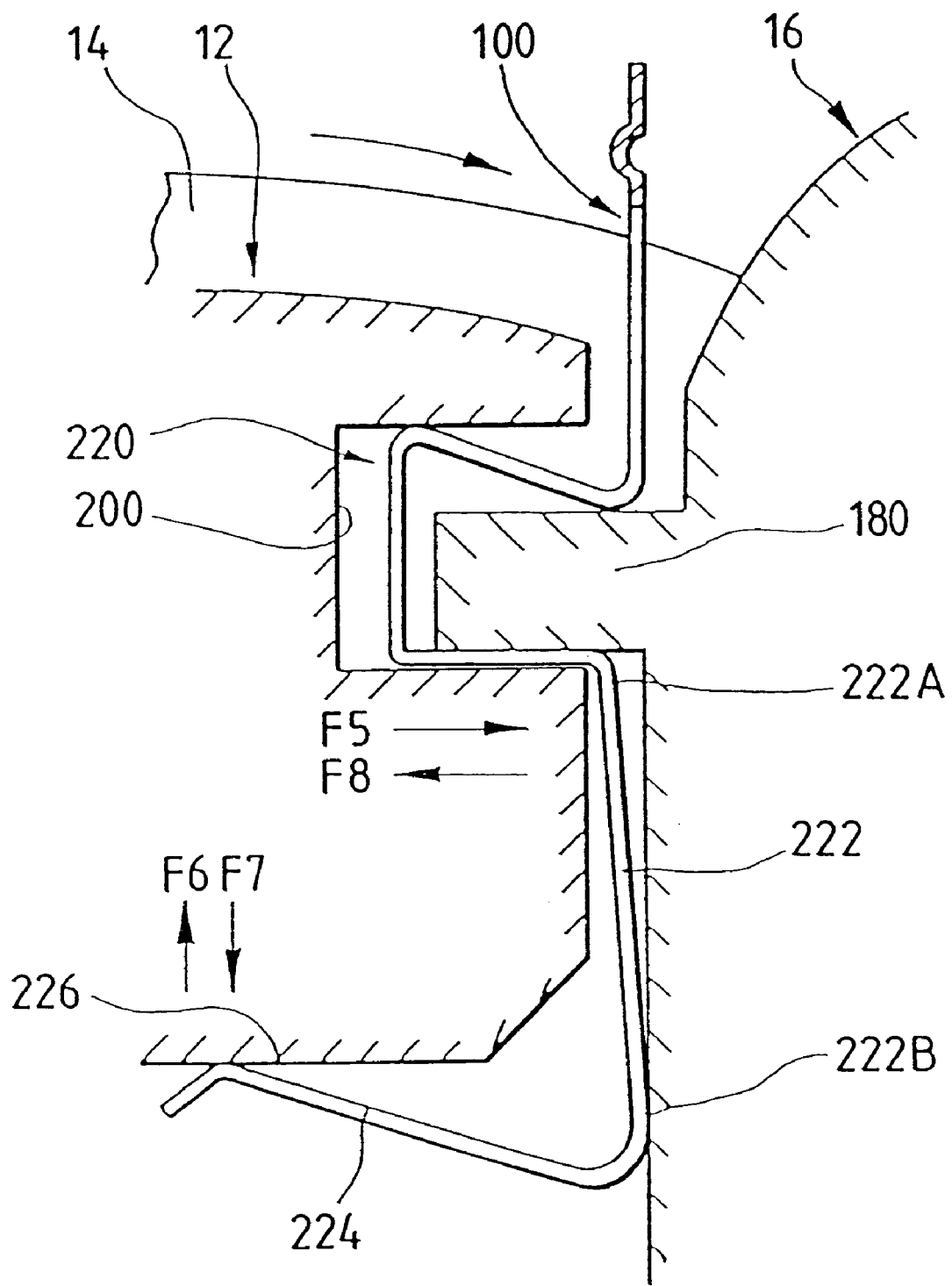
FIG. 3 is an enlarged section view of the main portions of a pad clip 100 according to a second embodiment of the invention; and, FIG. 4 an enlarged section view of the main portions of a pad clip 3 according to the prior art.
Figure 4:
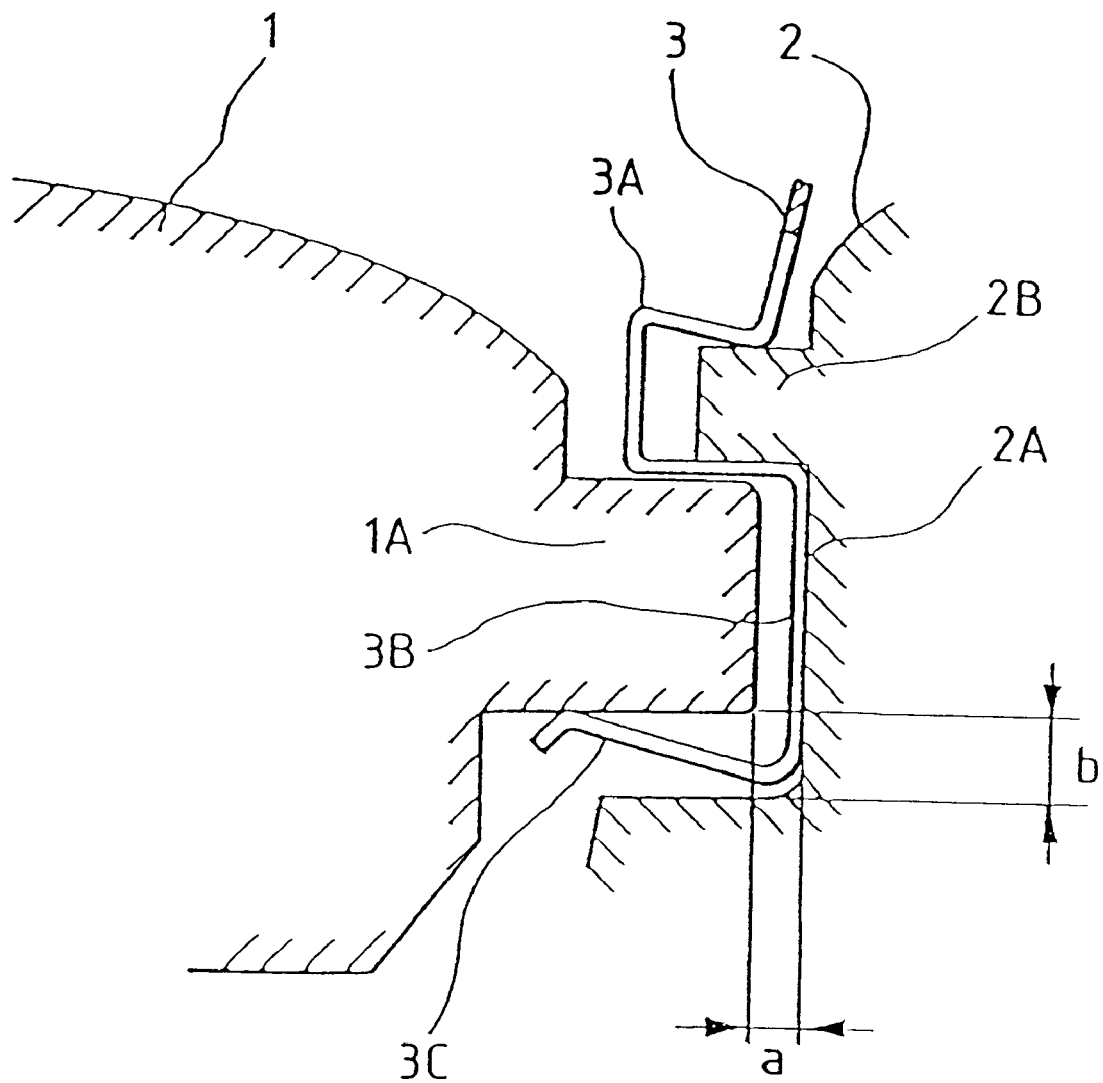

Next, in FIG. 3, there is shown a mounting structure for a pad clip 100 according to a second embodiment of the invention. The second embodiment is different from the above-mentioned first embodiment in that it is applied to a disc brake having a recess and projection fitting structure in which each of the friction pads 12 includes two recessed groove portions 200 in the two side edge portions thereof and the support member 16 includes projections 180. And, the pad clip 100 pressure holds the projection 180 therein and includes a U-shaped portion 220 for holding the pad clip 100 on the support member 16. Also, to the side of the pad clip 100 that is situated below the U-shaped portion 220, there is connected an anchor piece or inclined rotor peripheral direction pressing portion 222 which provides not only the side end face of the pad clip 100 but also the rotor peripheral direction pressing portion thereof. The present anchor piece 222, similarly to the previously described first embodiment, is inclined and disposed in such a manner that a pad contact portion 222A thereof to provide a contact portion between the anchor piece 222 and friction pad 12 is situated more outwardly in the rotor diameter direction than a support contact portion 222B serving as a contact portion between the anchor piece 222 and the support member 16. And, the lower edge side of the anchor piece 222 provides a rotor diameter direction pressing portion 224 which is curved upwardly and obliquely and is so set as to be able to press against the inner edge portion 226 of the friction pad 12.

Referring to the operation of the pad clip 100 having this structure, if the rotor 14 is pressure held by a fluid pressure cylinder mechanism provided in a caliper (not shown), then there is generated the moment of rotation in the friction pad 12, so that the friction pad 12 is pressed against the anchor piece 222 of the pad clip 100 around the pressure holding portion of the friction pad 12.

In this case, the pad contact portion 222A and rotor diameter direction pressing portion 224 support elastically the pressing force of the friction pad 12 with the support member contact portion 222B as the fulcrum thereof. That is, when the pressing force from the friction pad 12 is applied in the rotor peripheral direction (F5), the energizing force (F6) of the rotor diameter direction pressing portion 224 pressing the friction pad 12 outwardly in the rotor diameter direction is caused to increase with the support member contact portion 222B as the fulcrum thereof, thereby being able to restrict the movement of the friction pad 12. This prevents the friction pad 12 from tapping the support member 16 through the pad clip 100, thereby being able to prevent generation of a rattling noise.

Also, when the pressing force from the friction pad 12 is applied in the rotor diameter direction (F7), the energizing force (F8) of the anchor piece 222 pressing the friction pad 12 in the rotor peripheral direction is caused to operate with the support member contact portion 222B as the fulcrum thereof, thereby being able to restrict the movement of the friction pad 12. Due to this, similarly to the above-mentioned case, the friction pad 12 is prevented from tapping the support member through the pad clip 100, so that production of a rattling noise can be prevented.

Further, even if the friction pad 12 is moved in a composite direction including the rotor peripheral direction and rotor diameter direction in combination, while the support member contact portion 222B operates as a fulcrum, the anchor piece 222 and rotor diameter direction pressing portion 224 press against the friction pad 12 according to the moving direction of the friction pad 12, thereby being able to restrict the movement of the friction pad 12. As a result of this, it is possible to prevent generation of a rattling noise caused by the collision of the friction pad 12 with the support member 16 through the pad clip 100.

As has been described heretofore, according to the invention, there is provided a pad clip for use in a disc brake of a type that includes a friction pad disposed opposed to a rotor and a support member for supporting a brake force from the friction pad; in particular, the present pad clip for such disc brake is mounted between the end portion of the friction pad in the rotor peripheral direction thereof and the anchor portion of the support member for supporting the friction pad, and comprises a U-shaped portion formed after a projecting portion provided on the support member, a rotor diameter direction pressing portion for energizing the friction pad outwardly in the diameter direction of the rotor, and an inclined rotor peripheral direction pressing portion, characterized in that the inclined rotor peripheral direction pressing portion is interposed between the U-shaped portion and the rotor diameter direction pressing portion, and a point of contact between the rotor peripheral direction pressing portion and the friction pad is situated more outwardly in the rotor diameter direction than a point of contact between the rotor peripheral direction pressing portion and the support member. Thanks to this structure, if the friction pad is moved in the rotor peripheral direction, then the rotor diameter direction pressing portion of the pad clip presses against the friction pad outwardly in the rotor diameter with the contact point between the rotor peripheral direction pressing portion and the support member as the fulcrum thereof. And, this pressing force increases as the friction pad is moved further in the rotor peripheral direction due to the leverage, thereby being able to restrict the movement of the friction pad, with the result that generation of a rattling noise caused by the collision of the friction pad with the support member through the pad clip can be prevented.

Also, if the friction pad is moved in the rotor diameter direction, then the rotor peripheral direction pressing portion presses against the friction pad through the contact point between the friction pad and the pad clip with the contact point between the rotor peripheral direction pressing portion and the support member as the fulcrum thereof. And, this pressing force, similarly to the movement of the friction pad in the rotor peripheral direction, due to the leverage, increases as the friction pad is moved further in the rotor peripheral direction, thereby being able to restrict the movement of the friction pad; and, as a result of this, it is possible to prevent generation of a ratting noise which can be produced by the collision of the friction pad with the support member through the pad clip.

Here, even if the friction pad is moved in a composite direction including the rotor peripheral direction and rotor diameter direction in combination, the contact point between the rotor peripheral direction pressing portion and the support member serves as a fulcrum and, according to the moving direction of the friction pad, the rotor peripheral direction pressing portion and the rotor diameter direction pressing portion press against the friction pad, thereby being able to restrict the movement of the friction pad. As a result of this, it is possible to prevent production of a rattling noise caused by the collision of the friction pad with the support member through the pad clip.

What is claimed is:

1. A pad clip for use in a disc brake including a friction pad disposed opposed to a rotor and a support member for supporting a brake force from the friction pad, and the pad clip for supporting the friction pad, mounted between an end portion of the friction pad in a rotor peripheral direction and an anchor portion of the support member for supporting the friction pad, comprising:

a U-shaped portion formed for engagement with a projecting portion of the support member;

a rotor diameter direction pressing portion for biasing said friction pad outwardly in a diameter direction of the rotor; and an inclined rotor peripheral direction pressing portion, wherein the inclined rotor peripheral direction pressing portion is interposed between the U-shaped portion and the rotor diameter direction pressing portion, and a point of contact on the pad clip between the rotor peripheral direction pressing portion and the friction pad is situated more outwardly in the rotor diameter direction than a point of contact on the pad clip between the rotor peripheral direction pressing portion and the support member, such that a junction between the inclined rotor peripheral direction pressing portion and the U-shaped portion conforms to a corner portion of the friction pad.

2. The pad clip according to claim 1, wherein the rotor diameter direction pressing portion of the pad clip presses outwardly against the friction pad in the rotor diameter direction when the friction pad is moved in the rotor peripheral direction with the point of contact on the pad clip between the rotor peripheral direction pressing portion and the support member acting as a fulcrum thereof.

3. A pad clip in a disc brake system for insertion between a friction pad and a support member for supporting a braking force from the friction pad, comprising:

a U-shaped portion formed to engage a top surface and a bottom surface of a projecting portion of the support member having one end piece of the U-shaped portion interposed between a top surface of a projecting portion of the friction pad and the bottom surface of the projecting portion of the support member;

a peripheral direction pressing portion connected at an obtuse angle to the interposed end piece of the U-shaped portion extending outwardly away from the friction pad and toward the support member, such that a junction between the peripheral direction pressing portion and the U-shaped portion conforms to a corner portion of the projecting portion of the friction pad; and a rotor diameter direction pressing portion connected at the end of the peripheral direction pressing portion and contacting a bottom surface of the projecting portion of the friction pad.

4. The pad clip according to claim 3, wherein the rotor diameter direction pressing portion has a spring property for biasing the friction pad outwardly in the rotor diameter direction to restrict movement of the friction pad toward the support member.

5. The pad clip according to claim 3, wherein the peripheral direction pressing portion and the rotor diameter direction pressing portion each has a spring property to restrict movement of the friction pad toward the support member.

6. The pad clip according to claim 3, wherein the peripheral direction pressing portion has a spring property to restrict movement of the friction pad toward the support member.

7. The pad clip according to claim 3, wherein the rotor diameter direction pressing portion of the pad clip presses outwardly against the friction pad in a rotor diameter direction when the friction pad is moved in a rotor peripheral direction with a point of contact between the peripheral direction pressing portion and the support member acting as a fulcrum thereof.

8. A pad clip in a disc brake system for insertion between a friction pad and a support member for supporting a braking force from the friction pad, comprising:

a U-shaped portion formed to engage a top surface and a bottom surface of a projecting portion of the support member and a bottom surface of a first projecting portion of the friction pad, having one end piece of the U-shaped portion interposed between a top surface of a second projecting portion of the friction pad and the bottom surface of the projecting portion of the support member;

a peripheral direction pressing portion connected at an obtuse angle to the interposed end piece of the U-shaped portion extending outwardly away from the friction pad and toward the support member, such that a junction between the peripheral direction pressing portion and the U-shaped portion conforms to a corner portion of the second projecting portion of the friction pad; and a rotor diameter direction pressing portion connected at the end of the peripheral direction pressing portion and contacting a bottom surface of the second projecting portion of the friction pad.

9. The pad clip according to claim 8, wherein the peripheral direction pressing portion and the rotor diameter direction pressing portion each has a spring property to restrict movement of the friction pad toward the support member.

10. The pad clip according to claim 8, wherein the peripheral direction pressing portion has a spring property to restrict movement of the friction pad toward the support member.

11. The pad clip according to claim 8, wherein the rotor diameter direction pressing portion has a spring property for biasing the friction pad outwardly in the rotor diameter direction to restrict movement of the friction pad toward the support member.

12. The pad clip according to claim 8, wherein the rotor diameter direction pressing portion of the pad clip presses outwardly against the friction pad in a rotor diameter direction when the friction pad is moved in a rotor peripheral direction with a point of contact between the peripheral direction pressing portion and the support member acting as a fulcrum thereof.

* * * * *